United States Patent
Nasshan et al.

(10) Patent No.: US 9,308,848 B2
(45) Date of Patent: Apr. 12, 2016

(54) BACKREST PART FOR A SEAT, IN PARTICULAR A VEHICLE SEAT

(71) Applicant: Johnson Controls Components GmbH & Co. KG., Kaiserslautern (DE)

(72) Inventors: Jürgen Nasshan, Kaiserslautern (DE); Martin Scheib, Kappeln (DE)

(73) Assignee: Johnson Controls Components GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 14/403,487

(22) PCT Filed: May 7, 2013

(86) PCT No.: PCT/EP2013/059443
§ 371 (c)(1),
(2) Date: Nov. 24, 2014

(87) PCT Pub. No.: WO2013/178439
PCT Pub. Date: Dec. 5, 2013

(65) Prior Publication Data
US 2015/0151659 A1    Jun. 4, 2015

(30) Foreign Application Priority Data

May 29, 2012  (DE) .......................... 10 2012 208 993
Aug. 8, 2012  (DE) .......................... 10 2012 214 039

(51) Int. Cl.
B60N 2/68    (2006.01)

(52) U.S. Cl.
CPC  B60N 2/68 (2013.01); B60N 2/682 (2013.01); B60N 2/686 (2013.01)

(58) Field of Classification Search
CPC ........... B60N 2/68; B60N 2/682; B60N 2/686
See application file for complete search history.

(56) References Cited

U.S. PATENT DOCUMENTS

| 6,742,847 B2 | 6/2004 | Yanai | |
| 6,981,748 B2 * | 1/2006 | Garnweidner | B60N 2/686 297/218.1 |

(Continued)

FOREIGN PATENT DOCUMENTS

| CN | 101168354 A | 4/2008 |
|---|---|---|
| CN | 101219646 A | 7/2008 |
| CN | 102046418 A | 5/2011 |
| CN | 102837101 A | 12/2012 |
| DE | 103 29 017 A1 | 1/2005 |
| DE | 102004 055 349 A1 | 5/2006 |
| DE | 603 01 360 T2 | 6/2006 |
| DE | 602 02 686 T2 | 12/2006 |
| DE | 102005 43 084 A1 | 3/2007 |
| DE | 102006 04 466 A1 | 8/2007 |
| DE | 102006 04 467 A1 | 8/2007 |
| DE | 102006 05 751 A1 | 8/2007 |
| DE | 102006 38 785 A1 | 2/2008 |
| DE | 102007 42 169 A1 | 3/2009 |
| DE | 102008 20 289 A1 | 10/2009 |
| DE | 102010 05 652 A1 | 7/2011 |
| FR | 2924073 A1 | 5/2009 |
| GB | 0 477 665 A | 1/1938 |

OTHER PUBLICATIONS

English Translation of International Preliminary Report on Patentability for PCT/EP2013/059443 dated Dec. 2, 2014 (5 pages).*
International Search Report in PCT/EP2013/059443 dated Jul. 5, 2013, 3 pages.
Office Action dated Feb. 22, 2013 in German priority application No. 10 2012 214 039.5, 7 pages.
Office Action dated Oct. 9, 2012 in German priority application No. 10 2012 214 039.5, 6 pages.
Office Action dated Dec. 1, 2015, in corresponding Chinese applicationt No. 201380028310.8, 5 pages.

Primary Examiner — Rodney Mintz
(74) Attorney, Agent, or Firm — Foley & Lardner LLP

(57) ABSTRACT

A backrest part for a seat, in particular a vehicle seat, includes at least one back metal sheet and individual profiled elements. The back metal sheet has beadings which protrude in the direction of the profiled elements in some sections. The profiled elements are connected to the back metal sheet in a force-fitting and/or bonded manner in a region of the beadings. A section with beadings is formed in each corner of the back metal sheet. The beadings of each section are arranged in parallel at a specifiable distance to one another. The beadings of each section extend diagonally between the adjoining edges of the back metal sheet. The beadings of mutually adjacent sections run at an angle relative to one another. The length of the beadings running parallel to one another in each section decreases in the direction of the corners.

7 Claims, 2 Drawing Sheets

(56) References Cited

U.S. PATENT DOCUMENTS

Figure 1:
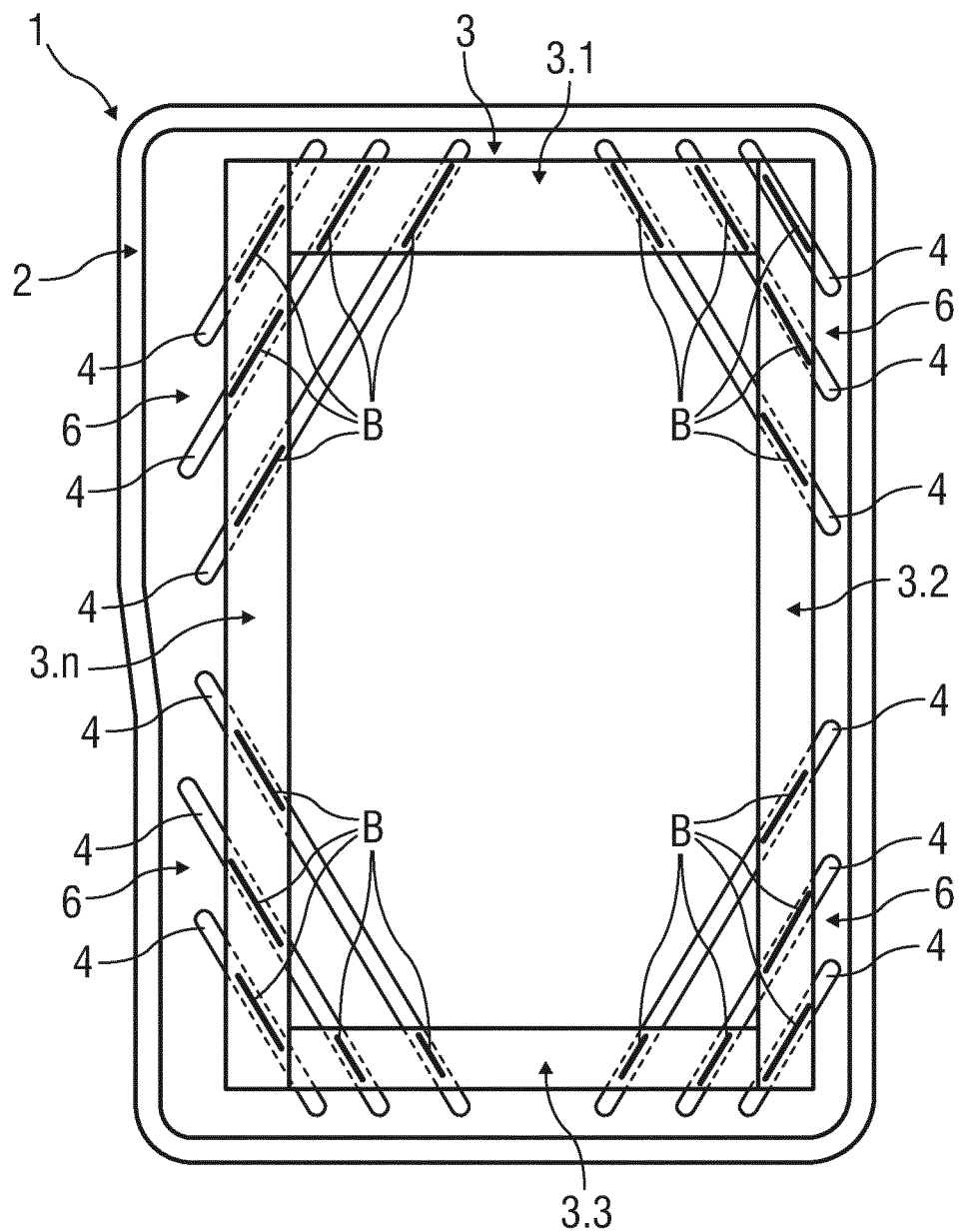

| | | | |
|---|---|---|---|
| 6,997,500 B2 | 2/2006 | Horsford et al. | |
| 7,635,165 B2 | 12/2009 | Robert et al. | |
| 7,753,443 B2 | 7/2010 | Uchida | |
| 7,874,607 B2 * | 1/2011 | Weiss | B60N 2/3013 296/65.01 |
| 8,657,382 B2 | 2/2014 | Eckenroth et al. | |
| 8,727,446 B2 * | 5/2014 | Tosco | B23K 37/04 297/452.48 |
| 9,227,271 B2 | 1/2016 | Kushiyama et al. | |
| 2003/0160482 A1 * | 8/2003 | Yanai | B60N 2/3013 297/216.13 |
| 2004/0160081 A1 * | 8/2004 | Horsford | B60N 2/065 296/65.09 |
| 2005/0231019 A1 * | 10/2005 | Gryp | B60N 2/686 297/452.18 |
| 2006/0103228 A1 * | 5/2006 | Gupta | B29C 49/4802 297/452.65 |
| 2008/0258520 A1 | 10/2008 | Uchida | |
| 2008/0277987 A1 * | 11/2008 | Deadrick | B60N 2/686 298/352 |
| 2012/0267935 A1 * | 10/2012 | Zekavica | A47C 7/02 297/452.18 |
| 2012/0306253 A1 * | 12/2012 | Seibold | B60N 2/68 297/354.1 |
| 2013/0020852 A1 * | 1/2013 | Corcoran | B60N 2/2222 297/452.18 |
| 2013/0161992 A1 * | 6/2013 | Zekavica | B60N 2/20 297/354.1 |
| 2013/0187417 A1 * | 7/2013 | Seo | B60N 2/68 297/216.13 |
| 2013/0334862 A1 * | 12/2013 | Gibbs | B60N 2/682 297/452.18 |
| 2014/0084661 A1 * | 3/2014 | Awata | B60N 2/5825 297/452.18 |
| 2015/0175229 A1 * | 6/2015 | Chiba | B62J 1/12 297/452.18 |

* cited by examiner

BACKREST PART FOR A SEAT, IN PARTICULAR A VEHICLE SEAT

CROSS REFERENCE TO RELATED APPLICATIONS

The present application is a U.S. National Stage of International Application No. PCT/EP2013/059443 filed on May 7, 2013, which claims the benefit of German Patent Application Nos. 10 2012 208 993.4 filed on May 29, 2012 and 10 2012 214 039.5 filed on Aug. 8, 2012, the entire disclosures of all of which are incorporated herein by reference.

The invention relates to a backrest part for a seat, in particular a vehicle seat.

A backrest part for a seat, in particular for a vehicle seat, is generally known and customarily has a load-absorbing supporting framework.

DE 10 2007 042 169 A1 describes a structural part of a vehicle seat, which has at least: a baseplate, at least one frame profile, preferably cap profile, for reinforcing the structural part, wherein the frame profile is connected to the baseplate. It is provided here that recesses, in particular elongated holes, are formed in the baseplate and projections with, for example, a serrated shape are formed on the frame profile, said projections being placed through the recesses of the baseplate. The frame profile is connected here to the baseplate preferably by a welded joint. Said welded joint can be, in particular, a laser welded joint, as a result of which cost-effective welding is possible over a large welding area without excessively complicated positioning measures.

U.S. Pat. No. 7,753,443 B2 describes a frame structure for a seat back.

DE 10 2008 020 289 A1 discloses a structural part, a vehicle seat with a backrest and a method for producing a structural part or a backrest. The structural part has at least one plate element and, furthermore, a first profile element and a second profile element. The first profile element and the second profile element are connected both to each other and also to the plate element by means of at least one welding in each case.

The plate element has first beads in a first connecting region to the first profile element and second beads in a second connecting region to the second profile element in such a manner that a minimum distance is provided between the first and second beads.

Further vehicle seat structures are known from DE 10 2010 005 652 A1, from DE 10 2006 004 466 A1, from DE 10 2006 004 467 A1, from DE 603 01 360 T2, from FR 2 924 073 A1, from DE 10 2004 055 349 A1, from U.S. Pat. No. 7,635,165 B2, from DE 10 2005 043 084 A1, from DE 10 2006 005 751 A1 and from DE 602 02 686 T2.

In addition, a metal structure for the interior equipment of a motor vehicle is described in DE 10 2006 038 785 A1, a metal frame for windows, doors and other purposes is described in GB 477,665 and a carrying construction for vehicle body structures made from rectangular hollow profiles is described in DE 103 29 017 A1.

Starting from this prior art, it is the object of the present invention to specify a backrest part for a seat that is improved in comparison to the prior art and has, in particular, improved load absorption.

With respect to the backrest part for a seat, the object is achieved by the features specified in claim 1.

Advantageous developments of the invention are the subject matter of the dependent claims.

The backrest part for a seat, in particular a vehicle seat, comprises at least one back plate and a plurality of individual profiles, wherein the back plate has beadings protruding in sections in the direction of the profiles, and the profiles are connected in a frictional and/or integrally bonded manner to the back plate in a region of the beadings. A section having a plurality of beadings is formed in each corner of the back plate. The beadings of each section are in each case arranged parallel to one another at a predeterminable distance.

According to the invention, the beadings of each section in each case extend diagonally between the adjacent edges of the back plate, wherein beadings of mutually adjacent sections run at an angle to one another, and wherein the length of the beadings running parallel to one another decreases in the respective section in the direction of the corners.

By the combination of back plate with reinforcing beadings and profiles which are connected in sections to the beadings of the back plate in a frictional and/or integrally bonded manner, a load-absorbing supporting framework which is simple to produce is provided for the backrest part.

Since a section having a plurality of beadings is formed in each corner of the back plate, customarily unstable sections of the back plate are effectively reinforced.

By means of the arrangement of the beadings of a section parallel to one another at a predeterminable distance, a uniform introduction and distribution of force is brought about.

Since the beadings of a section extend diagonally between the adjacent edges of the back plate, the forces which occur can be introduced into and distributed in the back plate in a particularly efficient manner.

In an advantageous embodiment, the profiles are arranged in an encircling manner on the back plate such that a profile frame is formed. Such an encircling profile frame brings about additional reinforcement of the backrest part and in particular increases a torsional rigidity.

In a further advantageous embodiment, adjacent profiles are arranged on the back plate in a manner overlapping on the end sides, and therefore a form-fitting connection is formed between the corresponding profiles, said connection improving a distribution of load between the profiles.

In alternative embodiments, the profiles can have an open or a closed cross section. As a result, the shaping and load-bearing capacity of the profiles is variably adaptable to the loadings occurring during operation of the backrest.

The beadings are advantageously of trough-like or channel-like design. This results in beadings which are shaped so as to be closed per se and which effectively reinforce the back plate.

In alternative embodiments, a cross section of the beadings is of trapezoidal, rectangular, square or rounded design or of rounded design with flattened portions. This makes it possible to form particularly torsionally rigid beadings.

In a particularly advantageous embodiment, at least one junction plate is arranged in the region of two mutually adjacent profiles on the surface sides thereof opposite the protruding beadings of the back plate and is connected to the respective profiles in a form-fitting, integrally bonded and/or frictional manner. In addition to the connection between back plate and respective profile, force can thereby be transmitted between the profiles which are connected by means of the junction plates.

The invention is described in more detail with reference to the attached schematic figures.

Figure 2:
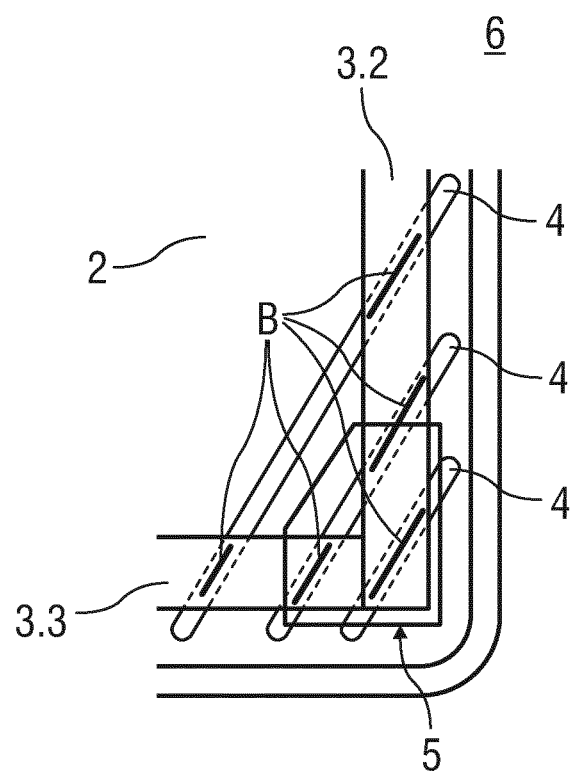

In the figures:

FIG. 1 shows schematically in top view a backrest part comprising a back plate provided with beadings and profiles of a profile frame that are fastened to said back plate, and FIG. 2 shows schematically in top view a detail of a backrest part with a back plate provided with beadings, and profiles which are fastened to said back plate and with junction plates at connecting points of profiles.

Mutually corresponding parts are provided with the same designations in all of the figures.

FIG. 1 shows in top view a backrest part 1 for a seat, in particular a vehicle seat.

The backrest part 1 is formed from a back plate 2 and a profile frame 3 with a plurality of profiles 3.1 to 3.$n$. The profiles 3.1 to 3.$n$ are separate parts which are not connected to one another. The profiles 3.1 to 3.$n$ have, in particular, different length and width dimensions such that said profiles, in the mounted state, form the encircling profile frame 3.

Furthermore, the ends of adjacent profiles 3.1 and 3.2, 3.2 and 3.3, 3.3 and 3.4, 3.4 and 3.1 and therefore the profiles 3.1 to 3.4 can be arranged on the back plate 2 in a manner partially overlapping one another on the end sides and perpendicularly to one another.

The profiles 3.1 to 3.$n$ can be open or closed. For example, the profiles 3.1 to 3.$n$ have an L, U or C shape with or without flattened portions, or a closed shape. In the closed shape, the profiles 3.1 to 3.$n$ can be designed as hollow profiles and can have a round, oval, rectangular or square cross-sectional shape. Furthermore, the round or oval cross-sectional shape can be provided with flattened portions.

In the case of a substantially rectangular back plate 2, two respectively mutually opposite profiles 3.1 and 3.3, and 3.2 and 3.$n$ have at least the same length, as shown in the example according to FIG. 1. Furthermore, the profiles 3.1 to 3.$n$ have the same or corresponding shapes, in particular cross-sectional shapes.

The back plate 2 has, in sections, beadings 4 which protrude in the direction of the profile frame 3. The beadings 4 are of trough-like or channel-like design and have a trapezoidal, rectangular, square or round cross section, wherein the round cross section can alternatively have flattened portions.

Furthermore, the beadings 4 can be of open or closed design on the surface side of the back plate 2 opposite the profile frame 3.

In the exemplary embodiment illustrated, the back plate 2 comprises four sections 6 which are provided in the corners of the substantially rectangular back plate 2. A plurality of beadings 4 running parallel to one another at a predeterminable distance are provided in the respective section 6. The beadings 4 of a section 6 preferably extend diagonally between the adjacent edges of the back plate 2. As a result, the beadings 4 have different lengths in a section 6.

In a development of the invention, all of the beadings 4 in all of the sections 6 of the back plate 2 have the same depth and/or same cross-sectional shape. Alternatively, said beadings can also vary.

Furthermore, the beadings 4 of mutually opposite sections 6 run parallel to one another. Beadings 4 of mutually adjacent sections 6 run at an angle to one another. As illustrated in FIG. 1, the beadings 4 of adjacent sections 6 run at an obtuse angle to one another. Alternatively and not illustrated specifically, the beadings 4 of adjacent sections 6 can run perpendicularly to one another. Furthermore, the length of the beadings 4 running parallel to one another decreases in the respective section 6 in the direction of the corners.

In order to connect the profiles 3.1 to 3.$n$ to a load-absorbing supporting framework, the profiles 3.1 to 3.$n$ are connected to the back plate 2 in a frictional and/or integrally bonded manner in the region B of the beadings 4 protruding from the back plate 2.

As the beading 4 becomes longer, the diagonal arrangement of the beading 4 also causes an increase here in the distance between the regions B in which the frictional and/or integrally bonded connection between back plate 2 and profile 3.1 to 3.$n$ is formed.

Furthermore, as illustrated in FIG. 2, the profiles 3.1 to 3.$n$ can additionally be provided with junction plates 5 and can therefore be connected to one another in the region of two mutually adjacent profiles 3.1 and 3.2, 3.2 and 3.3, 3.3 and 3.$n$ and/or 3.$n$ and 3.1 on the surface sides thereof opposite the protruding beadings 4. The shape of the junction plates 5 can be variable.

LIST OF DESIGNATIONS

1 Backrest part
2 Back plate
3 Profile frame
3.1 to 3.$n$ Profiles
4 Beadings
5 Junction plate
6 Section
B Region

The invention claimed is:

1. A backrest part for a seat, comprising:
   at least one back plate; and
   a plurality of individual profiles,
   wherein the back plate has beadings protruding in sections in a direction of the profiles, and the profiles are connected in at least one of a frictional and integrally bonded manner to the back plate in a region of the beadings,
   wherein the sections having a plurality of beadings are formed in each corner of the back plate,
   wherein the beadings of each section are in each case arranged parallel to each other at a predetermined distance,
   wherein the beadings of each section in each case extend diagonally between adjacent edges of the back plate,
   wherein beadings of mutually adjacent sections run at an angle relative to one another, and
   wherein a length of the beadings running parallel to one another decreases in the respective section in a direction of the corners.

2. The backrest part as claimed in claim 1, wherein at least one junction plate is arranged in a region of two mutually adjacent profiles on surface sides thereof opposite the protruding beadings of the back plate and is connected to the respective profiles in at least one of a form-fitting, integrally bonded, and frictional manner.

3. The backrest part as claimed in claim 1, wherein the profiles are arranged in an encircling manner on the back plate such that a profile frame is formed.

4. The backrest part as claimed in claim 1, wherein adjacent profiles are arranged on the back plate in a manner overlapping on an end side.

5. The backrest part as claimed in claim 1, wherein the profiles have an open or a closed cross section.

6. The backrest part as claimed in claim 1, wherein the beadings are of trough-shaped or channel-shaped design.

7. The backrest part as claimed in claim 6, wherein a cross section of the beadings is of trapezoidal, rectangular, square or rounded design or of rounded design with flattened portions.

* * * * *